United States Patent [19]

Kawasaki

[11] Patent Number: 5,031,213
[45] Date of Patent: Jul. 9, 1991

[54] CATV TERMINAL UNIT

[75] Inventor: Masahiko Kawasaki, Tokyo, Japan

[73] Assignee: Pioneer Electronic Corporation, Tokyo, Japan

[21] Appl. No.: 358,235

[22] Filed: May 30, 1989

[30] Foreign Application Priority Data

Sep. 21, 1988 [JP] Japan .................. 63-234925

[51] Int. Cl.⁵ ............................. H04N 7/16
[52] U.S. Cl. ................... 380/10; 358/86; 358/174; 455/3; 455/6
[58] Field of Search ............. 358/174, 86; 455/3, 455/6

[56] References Cited

U.S. PATENT DOCUMENTS 4,081,832  3/1978  Sherman ............... 380/19 X
4,718,086  1/1988  Rumreich et al. ........... 358/174 X

FOREIGN PATENT DOCUMENTS 0062289  4/1985  Japan .
0096086  5/1985  Japan .
0070881  4/1986  Japan .

Primary Examiner—Bernarr E. Gregory

Attorney, Agent, or Firm—Sughrue, Mion, Zinn, Macpeak & Seas

[57] ABSTRACT

A CATV terminal unit includes a channel converter for selecting and down-converting a designated channel, a sound volume adjusting section for electronically adjusting the sound volume of a received signal of the channel selected by the channel converter, a power on-off device for turning power on and off, a switch circuit turned on and off in association with the turning-on and turning-off operations of the power by the power on-off device and for controlling an output of AC power from an outlet for television power, and a programmable timer device for allowing a set channel to be received by turning on the power at a set time. The CATV terminal unit further includes a power on-off detecting device for detecting the turning-on and turning-off states of the power when a time set by the programmable timer device has been reached; and a sound volume control device for supplying a control signal for adjusting the sound volume of the sound volume adjusting section to a predetermined level when the turning-off state of the power is detected by the power on-off detecting device.

10 Claims, 3 Drawing Sheets

CATV TERMINAL UNIT

BACKGROUND OF THE INVENTION

The present invention relates to a CATV terminal unit disposed within a subscriber's house to receive a CATV broadcast.

In the CATV, a signal is transmitted via a transmission line such as a coaxial cable, etc., and its transmission band is divided into a number of channels which are efficiently used so as not to produce empty channels, and thus a video signal and an audio signal are transmitted. The normal television receiver cannot receive all the television programs transmitted thereto. Therefore, in the CATV, it is necessary to provide a terminal unit having a channel converter functions to receive channels which cannot be directly received by the television receiver. The terminal unit correspondingly has a function for selecting a designated channel.

The broadcast of the programs transmitted by the CATV is generally classified into a "rebroadcast" for transmitting broadcast programs as they are, and an original independent "broadcast" produced by a system operator. In the case of the independent broadcast, there is a "pay-channel" in which an additional charge must be paid every month, and there is a "pay-per-view channel" in which a charge is set every program. A subscriber of the CATV selects programs he wants to receive, makes an application for those programs and pays the charge corresponding to the service every month. Namely, there are channels receivable and non-receivable for only a basic charge. Since a signal of the chargeable channel is also transmitted by a common coaxial cable, it is necessary to take measures in which the subscriber paying only for the basic charge cannot receive this signal.

Therefore, a scrambling operation is performed with respect to the chargeable channels and only a descrambler of a terminal unit of an admitted subscriber is operated so that the scrambled signal is thereby returned to its original state.

These subscribers are discriminated by individually controlling the terminal units disposed within the houses of the respective subscribers by data from a broadcasting center. Therefore, each of the terminal units has a function for receiving this data and has recognition numbers such as addresses, ID numbers therein which are proper to the respective terminals.

Recently, another CATV terminal unit has been proposed. In this terminal unit, the operations such as the channel setting of the above channel converter and the turning-on-and-off of the electric power is controlled by not only the operation of an operating keyboard but also by a wireless remote controller. Further, an outlet for television power is disposed through a switch which is turned on and off in association with the turning-on and turning-off operations of the electric power of the terminal unit. The electric power is supplied to the television receiver from the outlet for television power. In such a construction, the power of the television is also simultaneously turned on and off by the operation of the wireless remote controller of the terminal unit, which is a convenient feature. However, such a conventional terminal unit has no sound volume changer, and therefore the sound volume is only adjusted by the operation of the sound volume changer (mechanical or electronic) of the television receiver, which is cumbersome in operation.

Accordingly, it has further been considered that the sound volume changer be disposed in the terminal unit, and in addition to the turning-on-and-off of electric power and the channel selection, the sound volume adjustment is also controlled by the wireless remote controller of the terminal unit. In such a construction, under the condition that the sound volume changer of the CATV terminal unit is set to a maximum value the sound volume changer of the television receiver is fixed to a maximum value at the ordinary watching situation of the television. In actual use the sound volume is adjusted by using the sound volume changer of the CATV terminal unit without using the sound volume changer of the television receiver.

In the CATV terminal unit having the sound volume adjusting function mentioned above, as shown in FIG. 1, a video recording apparatus 3 is sometimes connected between a CATV terminal unit 1 and a television receiver 2 and is used in this connecting state. In such a case, when a program of the CATV broadcast received by a terminal unit is recorded by the video recording apparatus 3, and the sound volume of the CATV terminal unit 1 is set to a low value or is in a mute state, only the picture image, that is, a picture image without sound is recorded to the video recording apparatus 3. When a person notices this state during the recording operation, the person can either increase the sound volume or release the mute state so as not to record the picture image without sound. However, when the so-called "absence recording" is performed by using a program timer function of the CATV terminal unit 1 and a timer function of the video recording apparatus 3, the picture image without sound might be recorded since there is no one watching the television receiver to notice this state.

SUMMARY OF THE INVENTION

Accordingly, an object of the present invention is to provide a CATV terminal unit with a sound volume adjusting function for automatically adjusting the sound volume to an optimal one in accordance with the situation thereof when the electric power is turned on by operation of a timer.

With the above object in mind, the present invention resides in a CATV terminal unit comprising, as shown in FIG. 2, a channel converter 12 for selecting and down-converting a designated channel, a sound volume adjusting section 20 for electronically adjusting the sound volume of a receiving signal of the channel selected by the channel converter 12, outlet power on-off means 22a for turning the power supplied to an outlet on and off, a switch circuit 32 turned on and off in association with the turning-on and turning-off operations of the outlet power by the outlet power on-off means 22a and controlling an output of the AC power from an outlet 34 for television power, and programmable timer means 16a for allowing a set channel to be received by turning on the power at a set time. The CATV terminal unit further comprises outlet power on-off detecting means 16b for detecting the turning-on and turning-off states of an outlet power when a time set by said programmable timer means 16a has been reached; and sound volume control means 16c for supplying a control signal for adjusting the sound volume to a predetermined value to said sound volume adjusting section 20 when the turning-off state of the power is detected by the outlet power on-off detecting means 16b.

In the CATV terminal unit constructed above, the AC power is supplied to the television receiver through the outlet 34 for television power and the switch circuit 32 turned on and off in association with the turning-on and turning-off operations of the outlet power by the outlet power on-off means 22a for turning the outlet power on and off.

Accordingly, by detecting the turning-on and turning-off states of the outlet power by the outlet power on-off detecting means 16b, the television-watching state can be detected by whether or not the power is supplied to the television receiver at the time set by the programmable timer means 16a which allows the set channel to be received by turning the power on at the set time.

Accordingly, when the time set by the programmable timer means 16a has been reached and the turning-off state of the outlet power is detected by the outlet power on-off detecting means 16b, the television receiver is not in the watching state and therefore it is unclear whether there is a person actually watching the television receiver at this time. Further, during this time it cannot be expected that the sound volume is checked by the person. Accordingly, the sound volume control means 16c supplies a control signal to the sound volume adjusting section 20 and performs the control operation for adjusting the sound volume to a predetermined value. Thus, for example, in the absence recording, etc., a recording of a picture image without sound can be prevented.

BRIEF DESCRIPTION OF THE DRAWINGS

The present invention will be more apparent from the following description of the preferred embodiments thereof in conjunction with the accompanying drawings in which.

DESCRIPTION OF THE PREFERRED EMBODIMENTS

The preferred embodiments of a CATV terminal unit in accordance with the present invention will be described with reference to the accompanying drawings.

Figure 1:
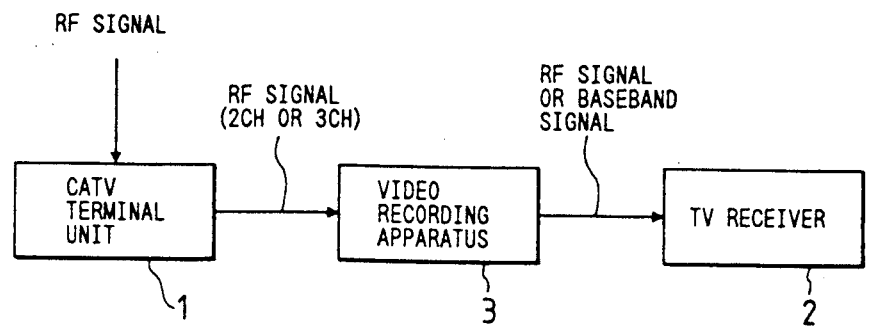
FIG. 1 is a block diagram showing a conventional CATV terminal unit.
Figure 2:
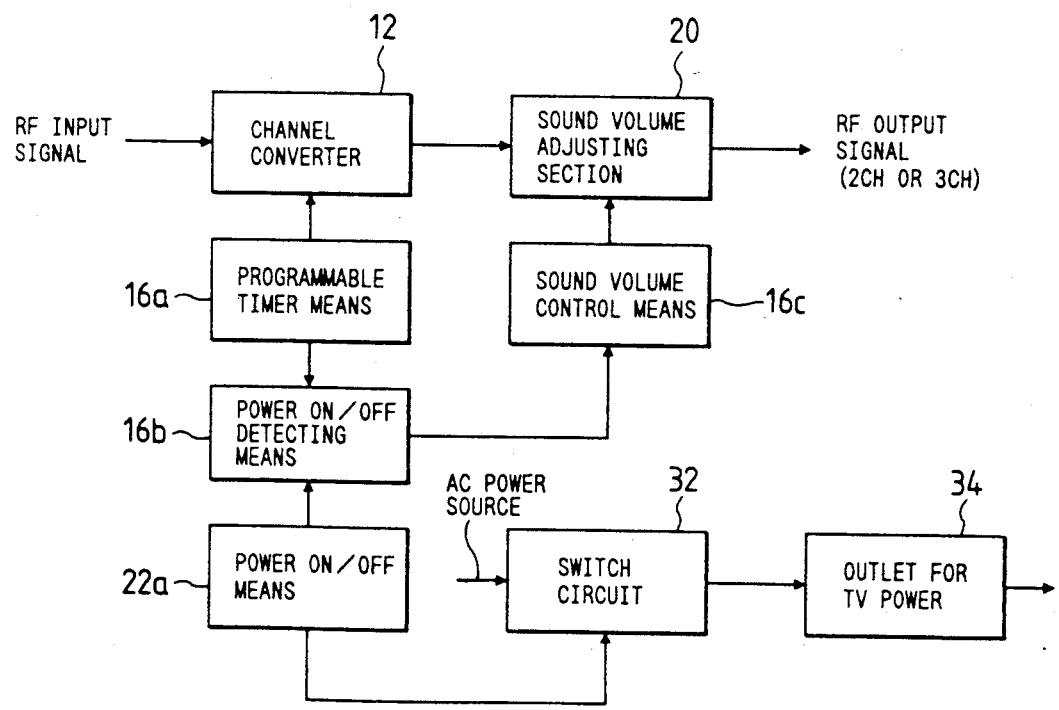
FIG. 2 is a block diagram showing the basic construction of a CATV terminal unit in accordance with the present invention.
Figure 3:
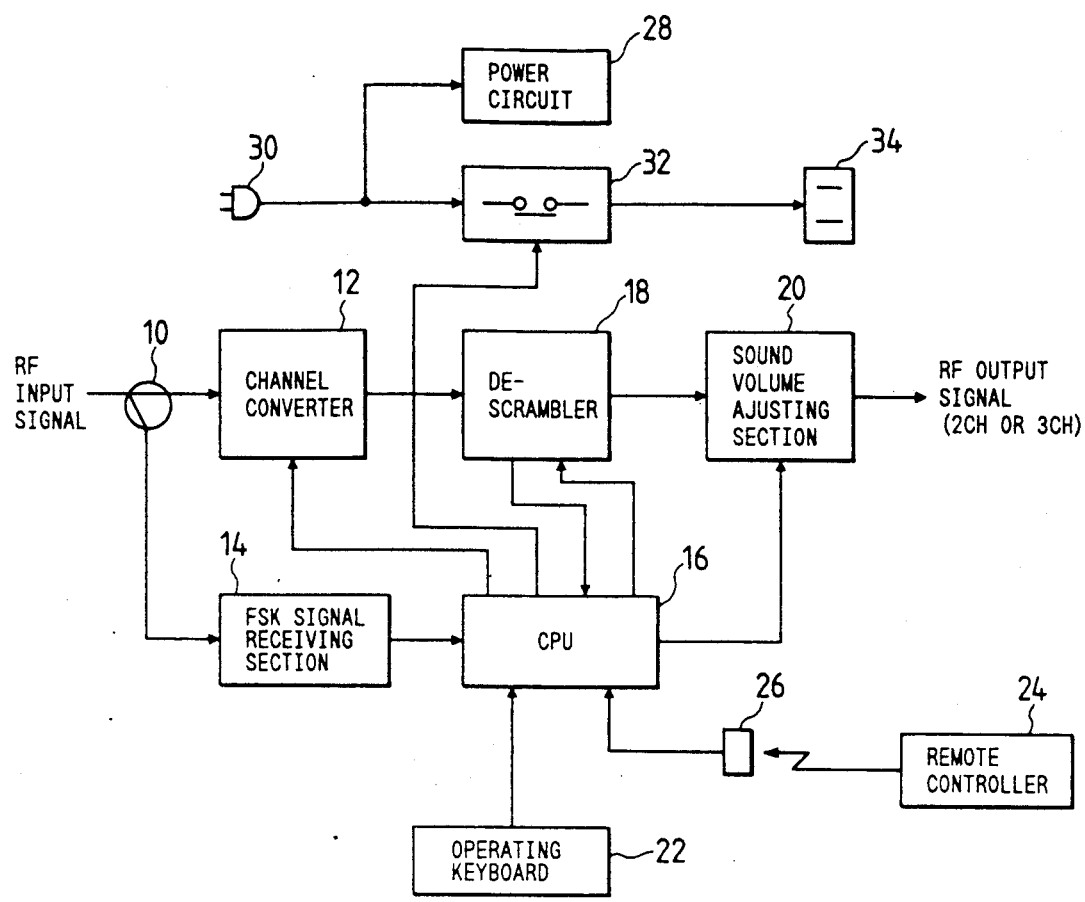
FIG. 3 is a block diagram showing one embodiment of the CATV terminal unit in accordance with the present invention.

FIG. 3 is a block diagram showing one embodiment of a CATV terminal unit in accordance with the present invention. In this figure, an RF signal composed of video signals of a plurality of channels, etc., is transmitted through a transmission line of a coaxial cable, etc. (not shown), and is inputted to the CATV terminal unit. This RF signal is distributed by distributor 10 and is inputted to a channel converter 12 and an FSK signal receiving section 14. Channel converter 12 selects a specific channel based on a station-selecting signal from a controller 16 comprising a CPU, and down-converts the selected channel signal. This down-converted specific channel signal is inputted to a descrambler 18 and a descrambling operation is performed by the descrambler 18 with respect to the down-converted specific channel signal if this signal has been scrambled. If this signal has not been scrambled, this signal passes through the descrambler 18 without the descrambling operation. The signal having passed through the descrambler 18 is inputted to a sound volume adjusting section 20, wherein the sound volume is adjusted, and is frequency-converted to a signal having a frequency of the second or third channel as an empty channel having no influence from a general broadcast wave. This converted signal is then supplied to a video recording apparatus or a television receiver which is not shown in this figure. The above FSK signal receiving section 14 extracts various kinds of data transmitted by the specific channel of the above RF signal and inputs this data to the controller 16.

The controller 16 is connected to an operating keyboard 22 and the above station-selecting signal is generated in accordance with the station-selecting key operation in the operating keyboard 22. This operating keyboard 22 has a key for selecting the broadcasting station, a key for turning on and off the electric power, a key for adjusting the sound volume, a key for setting a programmable timer, etc. The signals generated by these key operations are inputted to the controller 16. A signal similar to the signal generated when the operating keyboard 22 is operated, is inputted to the controller 16 through a remote control receiver 26 for receiving a remote control signal generated by a wireless remote controller 24.

The controller 16 judges whether the channel is a scramble channel or not by the signal from a scramble signal detecting means within the descrambler 18. If the channel which has been selected by using the data inputted in the controller 16 from the FSK signal receiving section 14 is the one admitted to be watched, the controller 16 supplies a control signal for performing the descrambling operation to the descrambler 18. Further, the controller 16 receives a signal generated by the operation for changing the sound volume by operating the keyboard 22 or wireless remote control device 24, and generates a signal for controlling the sound volume and supplies this signal to the sound volume adjusting section.

A power circuit 28 generates a power voltage required for the CATV terminal unit based on the AC power inputted by a plug 30. A switch circuit 32 comprising a relay for example, is turned on and off on the basis of a switch control signal from the controller 16. An outlet 34 for television power is connected to the above plug 30 through the switch circuit 32 and is connected to a plug of a television receiver (not shown).

Figure 4:
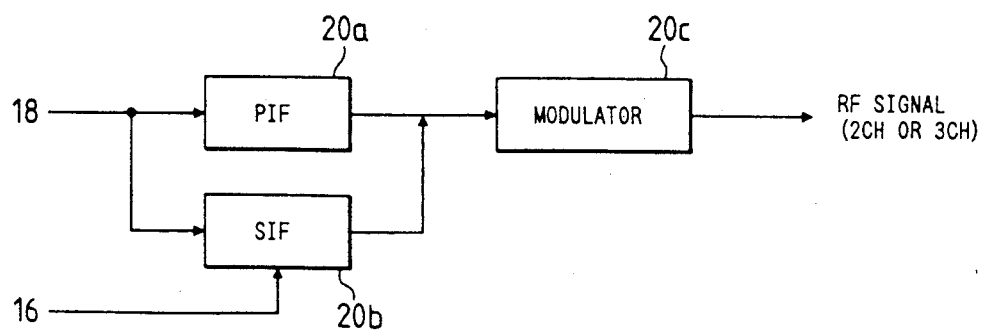
FIG. 4 is a block diagram showing a concrete example of a part of the terminal unit of FIG. 3.

As shown in FIG. 4, the sound volume adjusting section 20 has a picture intermediate frequency circuit (PIF) 20a and a sound intermediate frequency circuit (SIF) 20b, each of which receives the signal descrambled by the descrambler 18. The sound volume adjusting section 20 further includes a modulator 20c for receiving the signals from the intermediate frequency circuits 20a and 20b and converting these signals to a signal having the second or third channel frequency. The signal from the modulator 20c is supplied to a television receiver or a video recording apparatus. The control signal for adjusting the sound volume from the controller 16 is inputted to the sound intermediate frequency circuit 20b.

Figure 5:
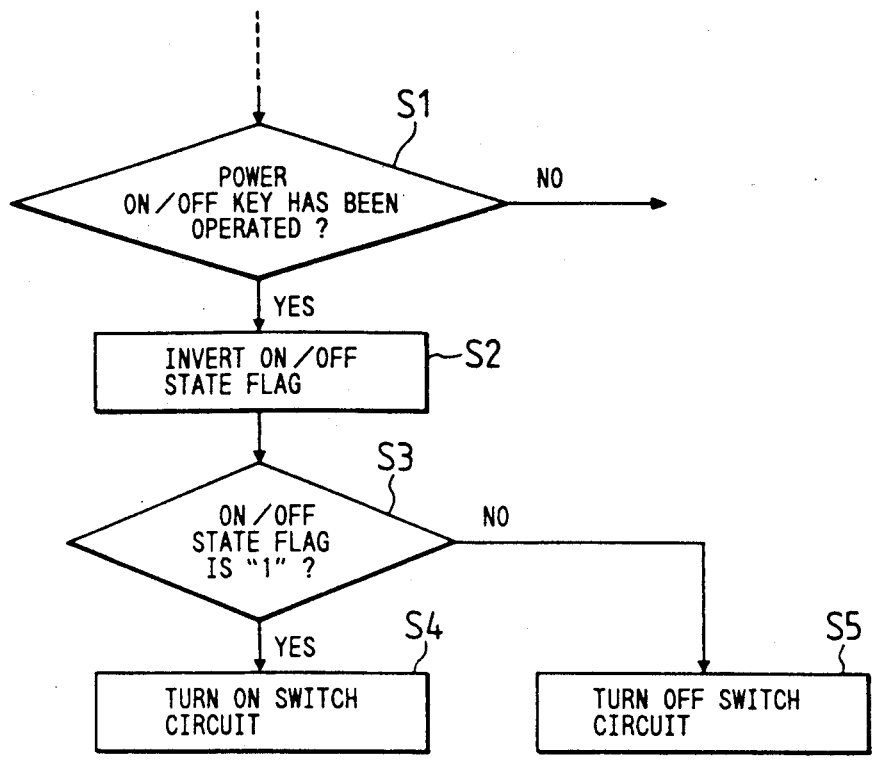
FIGS. 5 and 6 are flow charts respectively showing the operation of a controller of FIG. 3.
Figure 6:
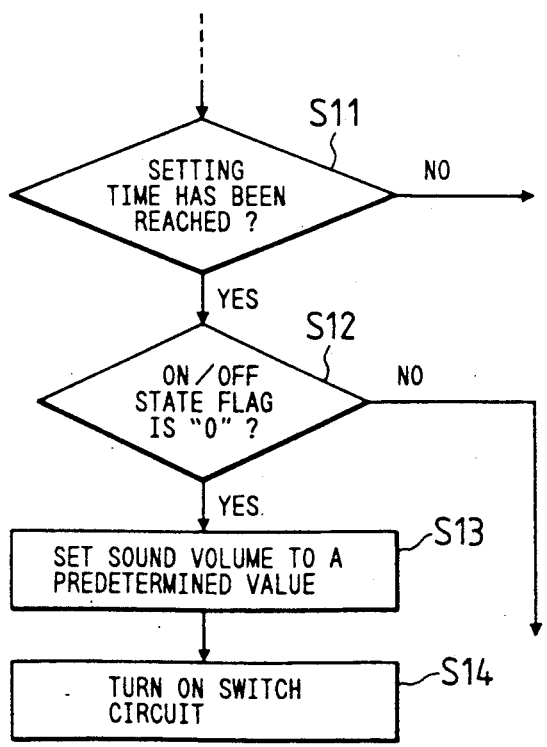

In the terminal unit constructed as above, the controller 16 (CPU) is operated as shown in the flow charts of FIGS. 5 and 6 in accordance with a control program stored in a ROM (not shown) in the controller 16.

Namely, as shown in FIG. 5, the CPU of the controller 16 monitors the key-operating state of the operating keyboard 22 and wireless remote controller 24, and judges whether the key for turning the outlet power on and off is operated or not in a specific step S1. When this judgment in step S1 is YES, i.e., the key for turning the outlet power on and off has been operated, it proceeds to a next step S2. When the judgment in step S1 is NO, i.e., the outlet key for turning the power on and off has not been operated, it proceeds to a step (not shown) for processing the judgment of the key operation. In step S2, an on-off state flag disposed in a predetermined area of a RAM provided in the CPU is inverted and thereafter it proceeds to step S3. The on-off state flag shows the power-on state of the outlet power by the number "1" and the power-off state of the outlet power by the number "0".

In step S3, it is judged whether the on-off state flag which has been inverted in step S2 is "1", and if it is, it proceeds to step S4 in which the control signal for turning the switch circuit 32 on and off is generated and the switch circuit 32 is turned on. When the judgment in step S3 is No, i.e., the flag has the number "0", it proceeds to step S5 in which the control signal for turning switch circuit 32 on and off is generated and the switch circuit 32 is turned off.

As shown in FIG. 6, when the CPU of the controller 16 is set by the function of the programmable timer, it is judged in step S11 whether or not the setting time is equal to the time of a clock disposed in the CPU 16. When this judgment is NO, i.e., the set time of the timer has not been reached, it proceeds to another step (not shown) to perform another processing operation. When the judgment in step S11 is YES, i.e., the set time of the timer has been reached, it proceeds to step 12 in which it is judged whether the on-off state flag is the number "0" or not.

When the judgment in step S12 is NO, i.e., the on-off state flag is the number "1", it is judged that the television receiver is operated and a person is watching the television receiver since, in this case, the switch circuit 32 is turned on and the power is supplied to the television receiver through the outlet 34 for television power. In this case, since the sound volume adjusting section 20 of the CATV terminal unit is adjusted such that the sound volume becomes a suitable one, it proceeds to the next step without performing any processing.

In contrast to this, when the judgment in step S12 is YES, i.e., the on-off state flag is the number "0", it is judged that the switch circuit 32 is turned off, the power is not supplied to the television receiver, the television receiver is not operated, and no person is watching the television receiver. In this case, since it is unclear how large the sound volume is adjusted in the sound volume adjusting section 20 of the CATV terminal unit, it proceeds to step S13 in which the sound volume control signal is outputted such that the sound volume value is set to a predetermined value and is supplied to the sound volume adjusting section 20 from the controller 16. After the sound volume is adjusted to the predetermined value in step S13, it proceeds to step S14 in which the control signal for turning switch circuit 32 on and off is outputted.

As mentioned above, when the time set by the programmable timer has been reached, it is judged whether or not the outlet power is already supplied to the television receiver through the outlet 34 for television power. Thus, it is judged whether the television receiver is operated or not. When it is judged that the television receiver is operated, it is then judged that the sound volume is adjusted to a suitable value and therefore no further adjustment is necessary. When it is judged that the television receiver is not operated, the sound volume is automatically adjusted so that the sound volume is suitably set to a predetermined value. By such an automatic adjustment of the sound volume, the disadvantages associated with the conventional terminal unit, that is, the disadvantages of recording a picture image without sound is prevented.

As mentioned above, in accordance with the present invention, when the time set by a timer has been reached and it is detected that the power of the television receiver is turned off, the television receiver is not in the watching state and it is unclear whether there is a person actually watching the television receiver. Since, in this case, it cannot be expected that the sound volume is checked by a person, the control operation is performed such that the sound volume is adjusted to a predetermined value or level. Accordingly, for example, during absence recording, etc., recording a picture image without sound can be prevented.

What is claimed is:

1. In a CATV terminal unit of the type comprising a channel converter for selecting and down-converting a designated channel, a sound volume adjusting section for electronically adjusting the sound volume of a signal received on the channel selected by the channel converter, outlet power on-off means for selecting between a power-on state and a power-off state of a power outlet, a switch circuit which is turned on and off in association with the selecting between a power-on state and a power-off state of the outlet power by the outlet power on-off means and which controls an output of an AC power outlet for television power, and programmable timer means for allowing a set channel to be received by turning on the power at a set time, the improvement comprising:

outlet power on-off detecting means for detecting the power-on and power-off states of the outlet power on-off means when a time set by said programmable timer means has been reached, said outlet power on-off detecting means supplying a control signal to said sound volume adjusting section for adjusting the sound volume to a predetermined level when the power-off state of the outlet power is detected.

2. A CATV terminal unit comprising:

processing means having programmable timer means, outlet power ON/OFF detecting means and sound volume control means;

receiving means for receiving a designated channel according to an output of said processing means;

a sound volume adjusting section, coupled to said receiving means, for adjusting a sound volume of a received channel; and outlet power ON/OFF switching means for supplying power to an outlet during an ON state, and for preventing power from flowing to the outlet during an OFF state, the ON/OFF states being controlled by said processing means;

said outlet power ON/OFF detecting means detecting the state of said outlet power ON/OFF switching means, and supplying a control signal to said volume adjusting section for adjusting a sound volume of a received channel to a predetermined level only when a set time of said programmable timer means has been reached and said outlet power ON/OFF detecting means detects the OFF state of said outlet power ON/OFF switching means.

3. The CATV terminal unit as defined in claim 2, further comprising a descrambler coupled between said receiving means and said sound volume adjusting section, said descrambler performing a descrambling operation on a received channel in response to a descramble output signal of said processing means.

4. The CATV terminal unit as defined in claim 3, further comprising a data extracting section, coupled to said receiving means and to said processing means, for extracting data from the received channel and for supplying the extracted data to said processing means, and wherein said descrambler includes scramble detecting means for detecting whether a received channel has been scrambled, said processing means outputting the descramble output signal only if said scramble detecting means detects that the received channel has been scrambled and the extracted data supplied from said information extracting section indicates that the CATV terminal unit is to receive the unscrambled channel.

5. The CATV terminal unit as defined in claim 2, wherein said sound volume adjusting section comprises a picture intermediate frequency circuit, a sound intermediate frequency circuit, and a modulator for receiving the output of said picture intermediate frequency and said sound intermediate frequency circuits.

6. The CATV terminal unit as defined in claim 5, wherein said control signal is supplied to said sound intermediate frequency circuit.

7. The CATV terminal unit as defined in claim 2, further comprising input information means for inputting information to said processing means, said input information means comprising at least one of an operating keyboard and a remote controller.

8. The CATV terminal unit as defined in claim 2, further comprising a video recording apparatus coupled to receive an output of said sound volume adjusting section, and a television receiver coupled to receive an output of said video recording apparatus.

9. The CATV terminal system as defined in claim 8, wherein said outlet is a power outlet for said television receiver.

10. A CATV terminal unit comprising:
a channel converter for receiving an RF input signal;
a sound volume adjusting section for receiving an output of said channel converter and for outputting an RF output signal;
sound volume controlling means for controlling said sound volume adjusting section such that said sound volume adjusting section is set to a predetermined level;
an AC power source;
outlet power ON/OFF switching means for supplying power from said AC power source to a power outlet for a television receiver during an ON state of said outlet power ON/OFF switching means;
programmable timer means for controlling said channel converter, said sound volume adjusting section receiving the output of said channel converter at a time set by said programmable timer means; and
outlet power ON/OFF detecting means for outputting a control signal when the set time of said programmable timer means has been reached and said outlet power ON/OFF switching means is in an OFF state;
said sound volume controlling means controlling the sound volume adjusting section to said predetermined level in response to the control signal from said outlet power ON/OFF detecting means.

* * * * *